United States Patent [19]

Kasai et al.

[11] Patent Number: 4,880,105

[45] Date of Patent: Nov. 14, 1989

[54] METHOD AND APPARATUS FOR DELIVERING SAUSAGES TO A BAR

[75] Inventors: Minoru Kasai, Kanagawa; Minoru Nakamura, Tokyo, both of Japan

[73] Assignee: Hitec Co., Ltd., Tokyo, Japan

[21] Appl. No.: 919,231

[22] Filed: Oct. 15, 1986

[30] Foreign Application Priority Data

Oct. 18, 1985 [JP] Japan ................. 60-232953

[51] Int. Cl.$^4$ ............................................. B65G 37/00
[52] U.S. Cl. ................................ 198/465.4; 17/1 F; 17/33
[58] Field of Search .............. 198/465.4, 485.1–487.1; 17/1 F, 33, 34; 226/104–107

[56] References Cited

U.S. PATENT DOCUMENTS

| 4,091,505 | 5/1978 | Muller et al. | 17/1 F |
| 4,547,931 | 10/1985 | Staudenrausch et al. | 17/1 F |
| 4,644,607 | 2/1987 | Sziede | 17/45 |
| 4,682,385 | 7/1987 | Kasai et al. | 17/1 F |

FOREIGN PATENT DOCUMENTS

| 179528 | 4/1986 | European Pat. Off. | 17/33 |
| 415899 | 4/1963 | Japan . | |
| 5950294 | 3/1976 | Japan . | |
| 5991833 | 10/1982 | Japan . | |

Primary Examiner—Joseph E. Valenza
Attorney, Agent, or Firm—Rosen, Dainow & Jacobs

[57] ABSTRACT

In an apparatus in which linked sausages are introduced and suspended from a bar in loops, the sausages are delivered to the bar first by suspending the loops of linked sausages from suspending means, arranging the bar at a position ahead of a leading loop of the sausages where a rearward portion of the bar will face the leading loop, delivering the suspended sausages to the bar starting from the leading loop and moving the sausages on the bar toward a forward end portion thereof.

24 Claims, 7 Drawing Sheets

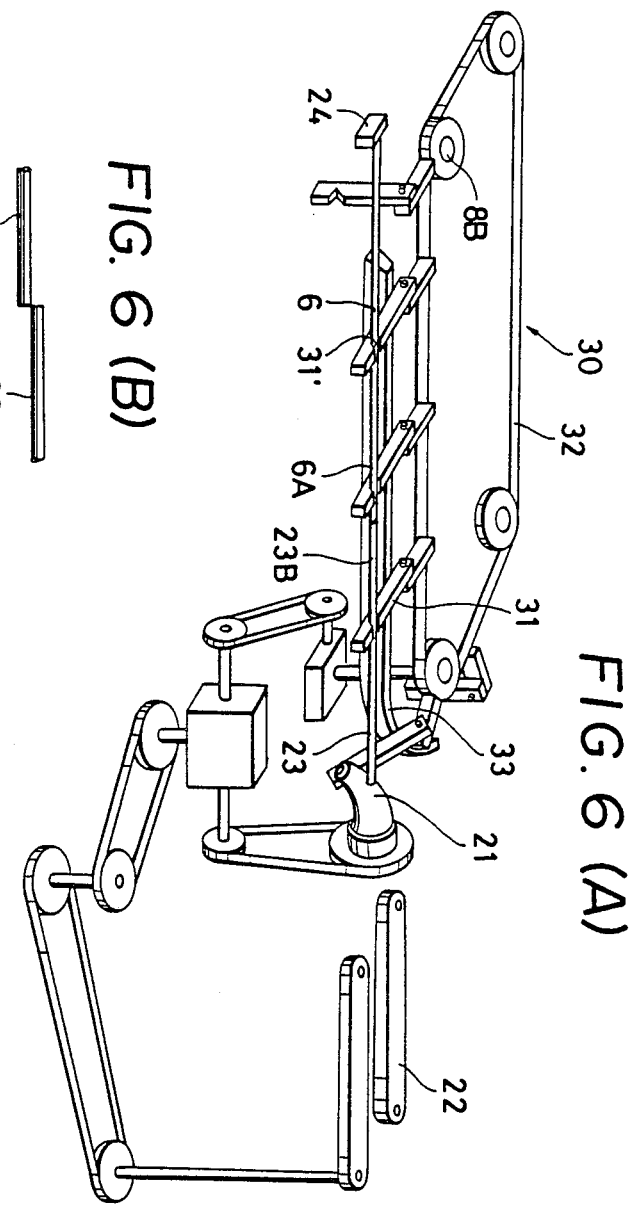

METHOD AND APPARATUS FOR DELIVERING SAUSAGES TO A BAR

BACKGROUND OF THE INVENTION

1. Field of the Invention

This invention relates to the manufacture of sausages and, more particularly, to a system in which sausages, after having been formed into interconnected links, are delivered to a freely detachable bar from a state in which the sausages are suspended in looped form from a suspending device.

2. Description of the Prior Art

Two methods are available for suspending a chain of linked sausages from a bar. One is to deliver the sausages to the bar after they have been temporarily suspended in loops on a suspending device by means of a looper. The other is to suspend the sausages from the bar in loops by transfering them to the bar directly from the looper.

Examples of the former method are disclosed in the specifications of Japanese Patent Publication (Kokoku) No. 41-5899, Japanese Patent Publication (Kokoku) No. 59-50294, Japanese Patent Application Laid-Open (Kokai) No. 59-91833, and U.S. Pat. No. 3,533,495. An example of the later method is disclosed in the specification of Japanese Patent Application No. 60-117423 published on Dec. 4, 1986.

Among the examples of the former method, Japanese Patent Publication Nos. 41-5899 and 59-50294 disclose apparatus for automatically forming linked sausages into loops and suspending the loops of sausages. The group of suspended sausage loops is delivered to the bar en masse usually by manually passing the bar through the group of loops and then lifting the bar.

Japanese Patent Application Laid-Open No. 59-91833 and U.S. Pat. No. 3,533,495 disclose apparatus for automatically delivering a group of suspended sausage loops to the bar. The method of delivering the sausage loops includes automatically passing the bar through the loops suspended from a screw shaft in Japanese Patent Application Laid-Open No. 59-91833 or conveyor hooks in U.S. Pat. No. 3,533,495, and thereafter delivering the sausages to the bar one loop at a time from a position at the forward end of the bar while the bar is caused to slide automatically, or delivering the loops of sausages to the bar en masse by lifting the bar automatically.

According to Japanese Patent Application No. 60-117423 representative of the latter method, one end of the bar is faced toward a looper, the sausages are hung directly on the bar in looped form, and the loops are advanced along the bar in successive fashion so that the loops are spaced apart a predetermined distance. Suspending the loops directly from the bar in this manner raises operating efficiency.

A number of problems are encountered in the prior art mentioned above.

First, in the method of delivering the sausage loops to the bar manually, as typified by Japanese Patent Publication No. 41-5899, the bar is inserted into the loops of sausages, which are hung from the suspending device, from one end of the group of loops while pushing the loops to the side in such a manner that the sausages are no damaged This method is disadvantageous in that, besides requiring the bar insertion step, the step itself has a low operating efficiency.

In accordance with Japanese Patent Application Laid-Open No. 59-91833, the bar must be slid to a point directly below the screw shaft, which serves as the suspended device, in the operation for delivering the sausages to the bar. The start of delivery to the bar only becomes possible once the bar is situated directly below the screw shaft. Accordingly, the only advantage over the art disclosed in Japanese Patent Publication No. 41-5899 is that the bar is inserted automatically. In other words, the step of inserting the bar is still required. This results in considerable idle time and necessitates a complicated mechanism. The automation of the bar insertion step does not solve these basic problems. In addition, the loops are delivered to the bar from the forward end thereof and do not move from this position. Therefore, when it is desired to lengthen the bar in order to accommodate a larger number of loops, the portion of the screw shaft that is to accept the bar must also be lengthened. This results in an apparatus of large size.

In U.S. Pat. No. 3,533,495, it is necessary for the bar to be thrust into the loops of sausage hanging from the conveyor hooks serving as the suspending device, and to subsequently lift the bar to which the loops have been so delivered. In this respect the disadvantage is the same as that encountered in Japanese Patent Application Laid-Open No. 59-91833, namely excessive idle time.

Thus, the arrangements that deliver the sausage loops to the bar automatically both possess the same drawback, namely the need to move the bar after it is inserted into the loops suspended from the suspending device.

The arrangements for delivering the sausages to the bar automatically also have a number of other shortcomings.

Specifically, since the bar is inserted into the suspended loops from one end thereof, each loop must possess a shape having a space where the loop will not make contact with the bar. However, with sausages made using natural intestine as the casing, the loop configuration is devoid of tension owing to the nature of the intestine, so that the suspended sausage links to the left and right of the bar come into contact with each other. The same is true for sausages made using an artificial casing if the size of the sausages is small, and the sausages to the left and right of the bar tend to be suspended in a twisted state in the manner of a rope while in contact with each other. Sausages having loops of such a shape are damaged by the butt end of the bar or make it impossible to insert the bar.

Furthermore, since the bar is inserted into the loops from its one end, the bar is capable of being supported solely at its other end. This necessitates a special-purpose bar of high rigidity, for if the loops of sausage suspended from the bar take on great weight, the bar ordinarily used in sausage manufacturing factories will be too slender and insufficiently rigid.

Japanese Patent Application No. 60-117423, which represents the latter method of sausage delivery, does not possess the drawbacks of the other prior art since the sausages are hung or draped directly from the bar. However, the art taught in this application does have certain shortcomings.

Specifically, when a full string of sausages has been hung from the bar in loops, the leading and trailing ends of the string are subjected to so-called terminal processing. However, since processing the trailing end of the string of sausages cannot be performed at the same time that the suspending of the sausages is completed, this processing is carried out during the step for suspending the next string of sausages. Accordingly, with the method of the above-described application, the bar from which the sausages have been suspended is temporarily moved to another location at the completion of the suspension step, and the trailing end of this string of sausages is then subjected to terminal processing while the next string of sausages is being hung from another bar. In other words, the bar is moved temporarily before the trailing end of the sausages is processed. This results in such operability-related problems as suspension of activity when the bar is moved, as well as an operation which is comparatively complicated.

SUMMARY OF THE INVENTION

The present invention has been devised in view of the foregoing problems encountered in the prior art and its object is to provide a method and apparatus for delivering sausages to a bar, wherein the bar is faced toward the loop at one end of a group of loops of suspended linked sausages and the loops are delivered to the bar, thereby making it possible to deliver the sausages to the bar with a high degree of operability, productivity and universality.

According to the present invention, the foregoing object is attained by providing a method of delivering sausages to a bar, wherein the sausages are introduced in linked form as a chain and suspended from the bar in loops The method comprises the steps of: suspending the loops of the chain of linked sausages; arranging the bar at a position ahead of a leading loop of the sausages where a rearward portion of the bar will face the leading loop; and delivering the sausages to the bar starting from the leading loop and moving the sausages on the bar toward a forward end portion thereof.

Further, according to the present invention, an apparatus for practicing the foregoing method comprises: suspending means for suspending a chain of linked sausages in loops; bar supporting means for detachably supporting the bar at a position ahead of a leading loop of the suspended sausages where a rearward portion of the bar will face the leading loop; delivery means for delivering the loops of the suspended sausage to the rearward portion of the bar; and transfer means for successively moving the loops delivered to the bar toward a forward end of the bar.

In operation, a chain of sausages in linked form is fed out of a looper in the form of loops which are successively suspended from the suspending means, whereupon the delivery means shifts these loops, starting from the leading loop, onto the rearward portion of the bar supported by the bar supporting means in such a manner that the rearward portion of the bar faces the leading loop. Each loop thus shifted onto the bar is moved toward the forward end of the bar by the transfer means, with the delivery being complete when one chain of sausages has been shifted onto the bar. The bar from which the loops hang is then removed from the apparatus and is replaced by a new bar to which the next string of sausages is to be delivered.

The transfer means can be improved upon in a number of ways. First, the transfer means can be extended at least up to a region at the forward end portion of the suspending means and made to serve also as the delivery means in this region, in which the sausages are received or taken over from the suspending means. Alternatively, feed means of the suspending means can be extended up to the rearward portion of the bar, and the suspending means can be made to serve also as the delivery means for feeding the sausages to the bar. Either arrangement simplifies the overall mechanism.

Second, an arrangement can be adopted in which the transfer means includes an endless traveling body having a transfer zone running from a region at the rearward portion of the bar or a least a region at the forward end portion of the suspending means toward a forward end portion of the bar and spaced away from the bar or from the bar and suspending means. The endless traveling body in such an arrangement would have a plurality of arms attached thereto for contacting the loops of sausages suspended from the bar. Further, an arrangement can be adopted in which each of the arms of the transfer means swings downwardly or is withdrawn longitudinally of the arm to a position out of contact with the sausages at the forward end portion of the bar and is subsequently returned to a position where it supports the suspending means and bar, by which time the bar is restored to a position at a rearward portion of the transfer zone. This assures that the spacing of the sausage loops will not be disturbed when the arms leave the transfer zone. Since the suspending means and bar are supported by the arms, positional deviation and flexing do not occur. This enables a slender suspending rod and bar to be used.

Third, the transfer means may comprise a helical body which rotates about an axis spaced away from the bar or from the bar and suspending means, the helical body extending from a region at the rearward portion of the bar or a least a region at the forward end portion of the suspending means toward a region at a forward end portion of the bar. Since the transfer means does not require a traveling portion in this arrangement, the apparatus can be simplified and made more compact. The bar and suspending means can be supported in various ways. They can be supported at one end in cantilever fashion, at both ends or over substantially their full lengths by the arms.

The suspending means can also be modified in various ways. For example, the suspending means may include a suspending rod for suspending the loops of sausage, and feed means for advancing the loops of sausage. Alternatively, the suspending means may have a plurality of support members attached to an endless traveling body to suspend the loops of the sausage, and front and rear drive wheels about which the endless traveling body is wound for being driven thereby. In the arrangement which adopts the suspending rod, the feed means can be made transfer means having a transfer region extended over the range of the suspending rod. Further, the forward end of the suspending rod can be arranged at a position where it abuts against the rearward end of the bar, or above the rearward portion of the bar, so that each loop can be slidingly shifted onto the bar from the suspending rod. Rather than bringing these two elements into simple abutting contact, it can be arranged so that the rearward end of the bar is supported by the forward end of the suspending rod. If the suspending means is in the form of the endless traveling body, the front drive wheel can be placed close to the rearward end of the bar and the support members disposed slightly above the bar. This will enable the delivery of the loops to the bar to be performed smoothly since the loops will fall from the support members onto the bar. If each of the support members can be made to spread or widen, even sausage loops of poor form can be delivered to the bar reliably without bumping against the rearward end of the bar and, hence, without being damaged.

If the feed means comprises arms attached to an endless traveling body, the suspending rod can also be supported by the arms in the same manner as the bar. In this case, a bar serving as the suspending rod may be supported at its rearward end by the looper.

If the suspending means can be varied in length in dependence upon the suspended length of sausages, this will make it possible to shorten the period of time needed to transfer the sausage loops to the bar.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The drawings illustrate the principal features of embodiments in accordance with the present invention, in which:

FIG. 6(A) is a perspective view showing a fifth embodiment of the apparatus;

FIGS. 6(B), (C) are front views showing modifications of the positional relationship between a bar and a suspending rod in the apparatus of FIG. 6(A);

DESCRIPTION OF THE PREFERRED EMBODIMENTS

Figure 1:
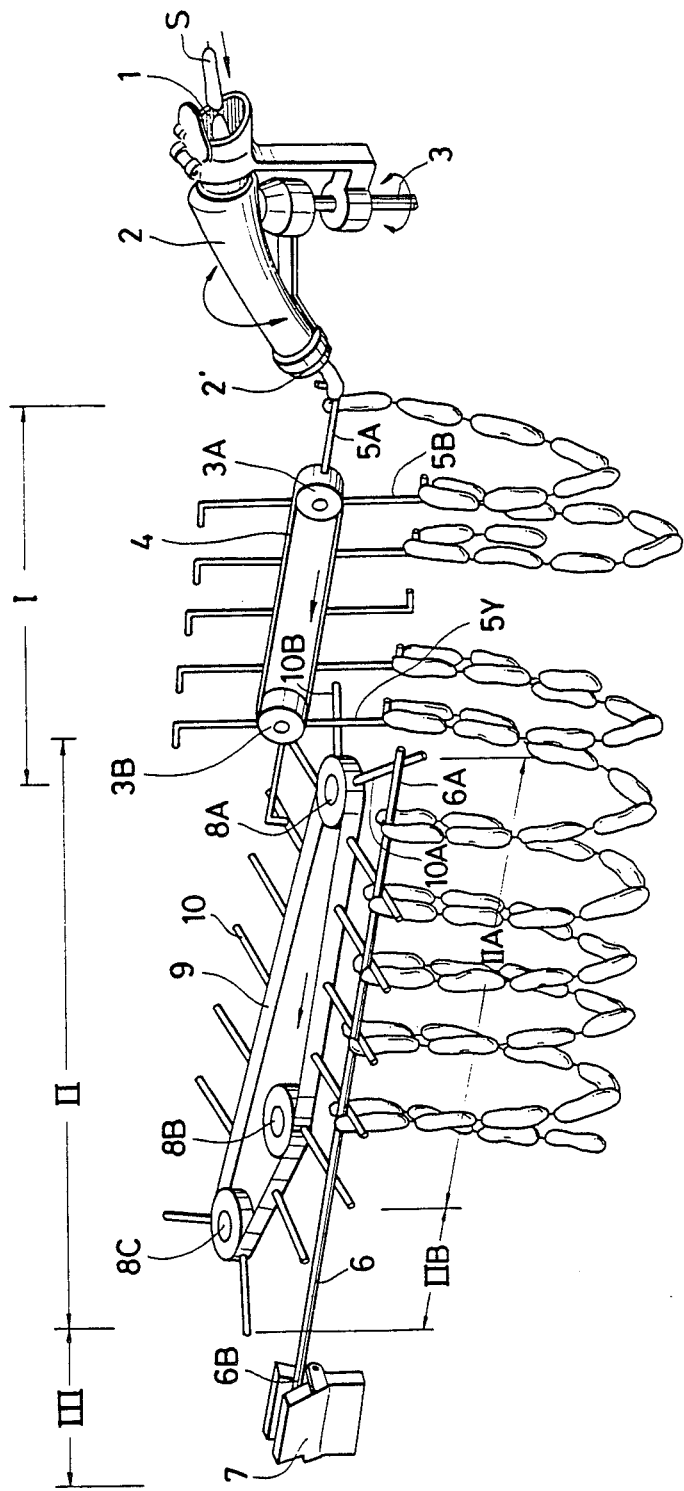
FIG. 1 is a perspective view showing a first embodiment of the apparatus.

A first embodiment of an apparatus according to the present invention will now be described with reference to FIG. 1. The apparatus includes a stationary inlet cylinder 1 for receiving a chain of linked sausages S which travels leftward in FIG. 1, and a cylindrical looper 2 having an inlet side, which is loosely fitted over the outlet side of cylinder 1, and an outlet side 2'. The looper 2 is swung from side to side by a shaft 3 rotated back and forth, whereby the outlet side 2' undergoes oscillatory motion about the inlet side.

Suspending means I is provided forwardly of the outlet side 2' of looper 2, namely downstream of the outlet side 2' in terms of the sausage traveling direction. The suspending means I includes two spaced driving sprocket wheels 3A, 3B, endless traveling means such as a chain 4 engaged with and stretched between the sprocket wheels 3A, 3B, and a series of hooks 5A through 5Z attached to the chain 4. The suspending means 1 is so arranged that the hook 5A which arrives at the rearmost position of the belt 4 will pass closely by the outlet side 2' of looper 2. Furthermore, the arrangement is such that succeeding hooks that pass by the same position one after another will do so in synchronism with the oscillatory period of the looper 2 so that the sausages emerging from the looper 2 will be suspended from the hooks in a looped manner.

With regard to the synchronism between the hooks and looper 2, the manner in which the sausages are hung from the hooks will differ depending upon the number of hooks that pass by the looper 2 during one side-to-side round trip of the looper. More specifically, if synchronization is set so that one hook will pass by the looper 2 during one round trip of the looper, the sausages are engaged and seized by the hooks from only one direction, so that the sausages are suspended in the form of helical loops. If it is arranged so that two hooks pass by the looper 2 during one round trip thereof, the sausages are alternately engaged and seized by the hooks from both the left and right directions thereof so that the loops formed are not helical. It should be noted that the looped configuration of the sausages mentioned above shall include both of these sausage suspending modes.

Transfer means II is provided forwardly or downstream of the suspending means I, and bar supporting means III is provided forwardly or downstream of the transfer means II.

The bar supporting means III includes a support 7 fixedly provided on a base (not shown) of the apparatus at a position at the forward end of the transfer means II. The support 7 is adapted to detachably grasp the forward end 6B of a bar 6 in cantilever fashion. The bar 6 thus supported by the support 7 has a rearward portion 6A extending up to the vicinity of the hook 5Z which, among the hooks 5A–5Z located on the lower side of chain 4, is situated at the forwardmost end of the suspending means I. The rearward portion 6A of bar 6 faces the space between the sausages hanging from the hook 5Z.

In order to prevent bending of the bar 6 when the loops of sausage become heavy, the bar positioned and supported by the support 7 may be rested upon arms 10, described below. In such case, since the bar 6 is positioned by the support 7, the arms 10 need not be provided with a cut-out 31' for bar positioning, as is formed in arms 31 of a fifth embodiment, described below. Arms 10 of simple configuration will therefore suffice.

The transfer means II is provided alongside the bar 6 supported as set forth above. The transfer means II comprises sprocket wheels 8A, 8B, 8C, endless traveling means such as a chain 9 engaged with the sprocket wheels 8A, 8B, 8C in a tensioned state, and a number of arms 10 attached to the chain 9 and extending horizontally outwardly therefrom. The transfer means II has a transfer zone IIA spaced away from the bar 6 and extending from the rearward portion 6A to the forward portion 6B of the bar 6. Each of the arms 10 is arranged so as to pass by the bar 6 close to or in sliding contact with its lower surface. At a position corresponding to the rearward most sprocket wheel 8A, the arrangement is such that an arm 10A which is about to enter the transfer zone IIA passes closely by the hook 5Z at the forwardmost position of the suspending means I. More specifically, the suspending means I has a forward portion that extends up to the rearward portion of transfer means II and functions as means for delivering the sausage loops to the bar 6 in this region. It is also arranged so that succeeding arms 10B, . . . pass by succeeding hooks 5Y, . . . one after another at the abovementioned forwardmost position in the synchronized manner described earlier.

The transfer means II also has a section IIB, which extends from the transfer zone IIA toward the forward end of the bar 6, in which the arms 10 gradually part from the bar 6. Thus, when the arms 10 leave the vicinity of the bar 6 in section IIB, they will not damage the sausages hanging from the bar.

It should be noted that the bar 6 and transfer means II can be oriented to change the direction of flow with respect to the suspending means I. This is useful when floor space is limited or when it is desired to alter the direction in which the sausages flow.

Let us now describe the method by which the sausages are delivered to the bar 6 in the embodiment of the invention set forth above.

First, the sausages fed out of the outlet side 2' of the swinging looper 2 are suspended in successive loops from the hooks 5Z that arrive in synchronism with the oscillatory period of the looper. These loops are advanced toward the transfer means II as the chain 4 circulates.

A loop of sausages suspended from the hook 5Z and advancing toward the transfer means II eventually reaches the forwardmost position of the suspending means I where the loop begins to revolve along the periphery of the forward sprocket wheel 3B. Since an arm of the transfer means II is synchronized to arrive at the above position at this time, the arm advances the loop, which slides off the hook 5Z onto the rearward end portion 6A of bar 6. Loops of sausage are shifted in the forward direction one after another by the arms 10A, . . . in this manner. When all loops constituting one string of linked sausages suspended in loops from the suspending means I have thus been shifted onto the bar 6, an operator removes the bar 6 from the support 7 and carries the bar to an apparatus for the succeeding process, such as heat treatment. The operator then sets a new bar on the support 7 in preparation for the next string of sausages.

Figure 2:
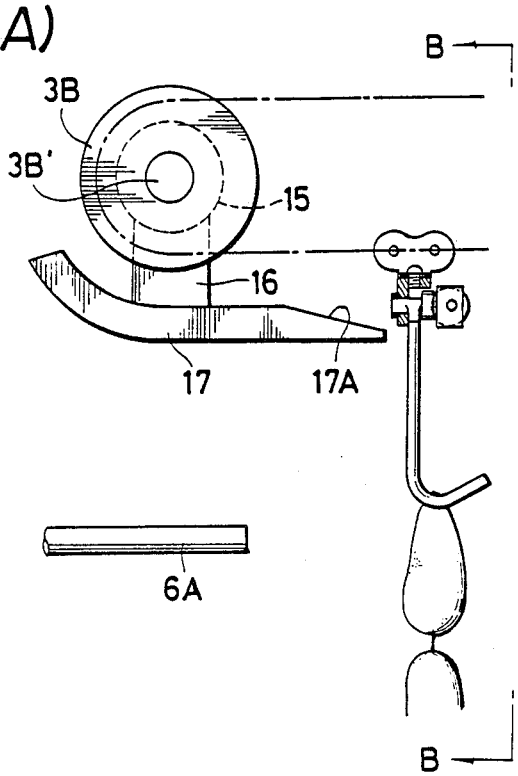
FIG. 2 illustrates a second embodiment representing an improvement over a portion of the apparatus of FIG. 1 for delivering sausages from hooks to a bar, wherein (A) is a front view with a portion thereof broken away and (B) is a sectional view taken along line B—B of FIG. 1(A)
Figure 2:
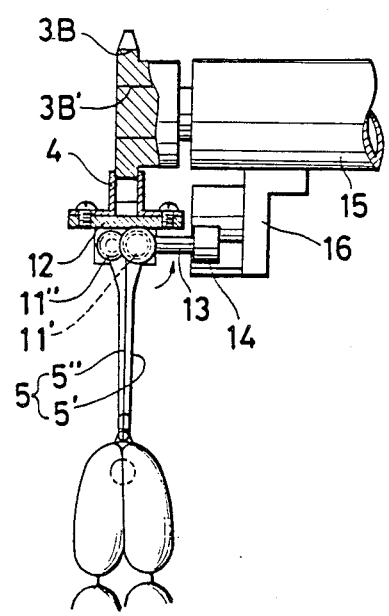
Figure 3:
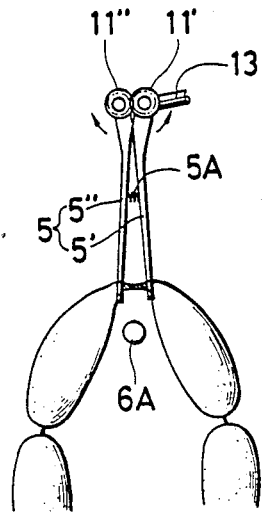
FIG. 3 is a side view corresponding to FIG. 2(B) and illustrating hooks in a spread state in the apparatus of FIG. 2(B)

FIGS. 2(A), (B) and FIG. 3 illustrate a second embodiment of the invention which improves upon the first embodiment by smoothing the delivery of the sausages from the hooks to the bar. As shown in FIGS. 2(A), 2(B), each hook 5 of FIG. 1 comprises a pair of hooks 5', 5" meshed at their upper ends by gears 11', 11". Interposed between the hooks 5', 5" is a tension spring 5A, shown in FIG. 3. The gears 11', 11" are rotatably supported on a mounting plate 12 attached to the chain 4. Fixedly secured to the gear 11' is a shaft 13 extending at right angles with respect to the axis of the gear 11'. Attached to the distal end of the shaft 13 is a cylindrically shaped cam follower.

The forward sprocket wheel 3B has a shaft 3B' supported by a journal portion 15. Extending from the journal portion 15 is a depending arm 16 having a lower end portion to which is attached a ski-shaped plate cam 17 having a tapered portion 17A at its rearward end. The plate cam 17 is shaped in such a manner that its tapered portion 17A is situated immediately to the rear of the rearward portion 6A of bar 6, with the remaining portion of the plate cam 17 serving to guide the cam follower 14 along the path of chain 4.

When the hook 5d nears the rearward portion 6A of bar 6, the cam follower 14 rides up on the tapered portion 17A of cam plate 17, as a result of which the shaft 13 to which the cam follower 14 is attached rotates counter-clockwise in FIG. 2(B). Thus, the gear 11' rotates counter-clockwise, thereby rotating the meshing gear 11" in the clockwise direction. As a result, the hooks 5', 5" are spread apart, as shown in FIG. 3. Since the rearward portion 6A of bar 6 faces the space between the hooks 5', 5" thus spread, the sausage loops will be shifted onto the bar 6 in a reliable manner.

After the hooks 5', 5" thus deliver a sausage loop to the bar 6, they separate from the cam 17. When this occurs, the hooks 5', 5" are returned to their closed positions by the force of spring 5A to assume the configuration of a single hook.

This embodiment is very useful when the direction of the bar and transfer means is changed in the previous embodiment.

Figure 4:
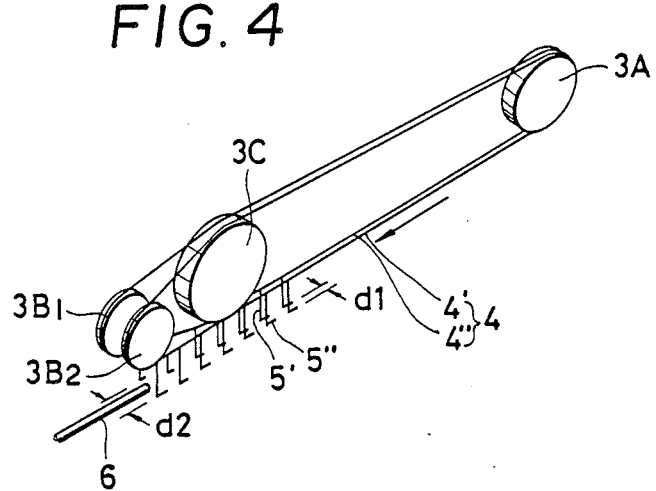
FIG. 4 is a perspective view showing the essential portion of a third embodiment.

FIG. 4 illustrates a third embodiment representing another approach for attaining an objective similar to that of the second embodiment. In the third embodiment, the chain 4 having the hooks 5 is constituted by a pair of chains 4', 4". The chains 4', 4" are stretched between the forward sprocket wheel 3B and rearward sprocket wheel 3A via an intermediate sprocket wheel 3C. In order to guide the chains 4', 4", the rearward sprocket wheel 3A and intermediate sprocket wheel 3C each have teeth (not shown) arranged in two rows having a spacing $d_1$ between them. The forward sprocket wheel 3B comprises two sprocket wheels $3B_1$, $3B_2$ spaced apart a distance $d_2$ in the axial direction. The chains 4', 4" respectively engage the sprocket wheels $3B_1$, $3B_2$. Accordingly, the hooks 5', 5" travel with the small distance $d_1$ between them in the region between the rearward sprocket wheel 3A and intermediate sprocket wheel 3C and then gradually spread apart as they travel from the intermediate sprocket wheel 3C to the sprocket wheels $3B_1$, $3B_2$. The spacing between the hooks 5', 5" becomes $d_2$, which is greater than the diameter of the bar 6, at the position of the forward sprocket wheels $3B_1$, $3B_2$. Accordingly, the loops of sausage are also spread apart and shifted onto the bar 6 in a reliable manner, as in the second embodiment.

Figure 5:
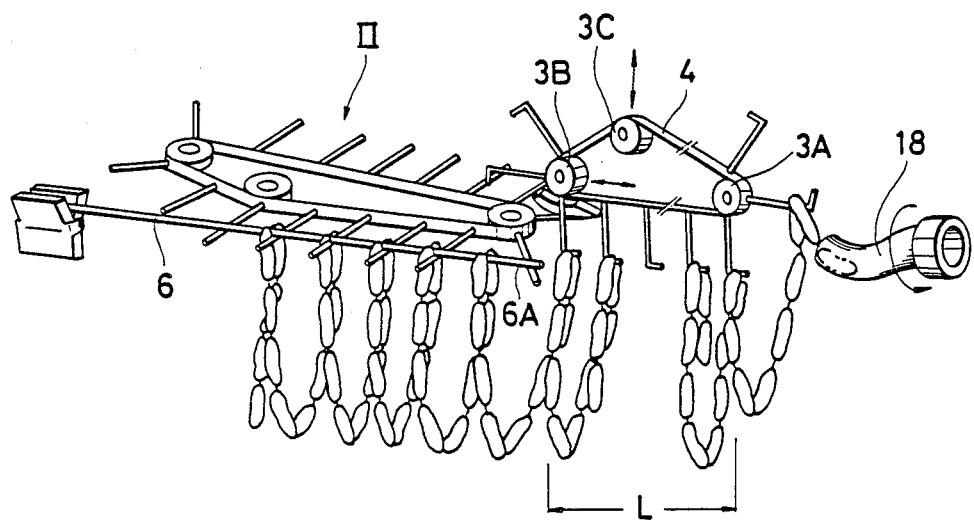
FIG. 5 is a perspective view showing a fourth embodiment of the apparatus.

FIG. 5 illustrates a fourth embodiment representing a further improvement. With the apparatus shown in FIG. 5, the length of the suspending means can be adjusted when the chains of sausage are not particularly long, thus enabling the sausages to be delivered to the bar in a shorter period of time. Specifically, in the present embodiment, the forward sprocket wheel 3B is capable of being moved back and forth and, in concurrence therewith, the intermediate sprocket wheel 3C is capable of being moved up and down. Accordingly, the length L of a suspending section of the suspending means can be varied by moving the forward sprocket wheel 3B without changing the length of the chain 4. With movement of the forward sprocket wheel 3B, the bar 6 and transfer means II must also be moved and the rearward end 6A of bar 6 must positioned close to the forward sprocket wheel 3B. Thus, in accordance with the present embodiment, the length L of the suspending section can be made to correspond to the number of loops of sausage to be suspended from the suspending means when the chain of sausages is short. This arrangement allows the leading loop of the chain of sausages to be shifted onto the bar 6 without wasting time.

In the present embodiment, the looper for feeding out the sausages so that they will be suspended in loops from the suspending means is a rotating sleeve 18 of generally helical configuration instead of the swinging-type cylindrical looper 2 of FIG. 1. The loops of sausage suspended from the suspending means in this case will be helical in form.

With the suspending means of the present embodiment, it is possible to adjust the length of the suspending section without moving the sprocket wheels. That is, when a hook arrives at a predetermined forward position, the hook can be turned 90° to a horizontal attitude, with the rearward end of the bar being disposed at the position where this attitude is attained. With such an arrangement, the loops will be shifted onto the bar one after another by falling from the hooks.

FIG. 6(A) illustrates a fifth embodiment of the invention in which the suspending means and transfer means are more closely related than in the foregoing embodiments and, in part, employ common means.

In FIG. 6(A), numeral 21 denotes a looper for feeding out sausages in the form of loops. The linked sausages are received from a linking apparatus 22 adapted to link the sausages. The looper 21 is cylindrical in shape and has a suspending rod 23 extending forwardly from its outer surface along its axis of rotation. Thus, the suspending rod 23 is stationary with respect to the looper 21. The freely detachable bar 6 is supported forwardly of the suspending rod 23 by an arm 31 of the transfer means 30, which doubles as delivery means in a manner described below, in a state where the rearward end of the bar 6 is abutted against the forward end of the suspending rod 23. In other words, unlike the foregoing embodiments, the transfer means extends along substantially the entirety of the suspending rod 23 and bar 6, and the bar 6 and suspending rod 23 are supported by the arm 31.

It should be noted that the arrangement of the suspending rod 23 and bar 6 is not limited to that described above in which the opposing ends of the two are in direct abutting contact. Specifically, as shown in FIGS. 6(B) and 6(C), it is permissible to dispose the bar 6 below the suspending rod 23 in such a manner that the sausage loops are transferred from the rod 23 to the bar 6.

In the present embodiment, the suspending rod 23 is supported over its entire length by the arms 31. This is advantageous in that the rod 23 can be reduced in diameter. For the same reason, the present embodiment is advantageous in that it enables use of a slender bar 6 ordinarily employed when the sausages are heat treated.

The arms 31 are attached to an endless traveling body 32 circulatingly engaging sprocket wheels. Each arm 31 is capable of pivoting freely about one end but is biased downwardly by an internal mechanism (not shown) employing a spring or the like.

Arranged along the traveling body 32 at the side of the bar 6 is a cam 33 which gradually pivots the arms 31 upwardly until the arms assume a horizontal attitude at the rearward portion of the suspending rod 23. The cam 33 extends generally linearly along the bar 6 from the rearward portion of the suspended rod 23 to the forward portion of the bar 6 and maintains the arms 31 in the horizontal attitude. Accordingly, since the arms 31 will separate from the cam 33 at the forward portion of the bar 6, the arms will be swung downwardly in rapid fashion by the aforementioned internal mechanisms to part from the sausage loops. This arrangement widens the region in which the loops can be suspended from the bar and therefore allows the bar to be utilized effectively. In addition, when the arm 31 rounds the sprocket wheel 8B and moves along the endless traveling body 32 in a direction taking it away from the bar 6, the bar 6 will not be snagged by a V-shaped cut-out 31', described below, formed in the arm 31.

The V-shaped cut-out 31' is formed in the upper surface of each arm 31 to serve as a bar support portion. In addition to being supported, the bar 6 is positioned in the longitudinal direction of the arms 31 by the cut-outs 31'. Supporting the bar 6 by these V-shaped cut-outs 31' is desirable in that the arms 31 can be made to contact the loops at positions very close to the locations where the loops are suspended.

Arranged at the forward portion of the bar 6 is a stopper 24 which contacts the forward end face to prevent the bar from moving forward. If the stopper is realized by the bar support 7 shown in FIG. 1, the bar 6 will not sway from side to side. This will make it possible to dispense with the V-shaped cut-outs provided in the arms.

Since the bar is thus supported by a series of the arms 31, support means such as used in the previous embodiment need not be specially provided.

A sixth embodiment of the invention will now be described with reference to FIG. 7.

Though this embodiment somewhat resembles the previous embodiment, it is characterized in that the endless traveling body travels in a plane at right angles to the arms, and in that the arms are withdrawn rapidly from the bar 6 in the axial direction at the forward portion of the bar. The suspending rod 23 has one end thereof inserted into a cylindrical support portion 21'A of a looper 21' and is freely detachable. Accordingly, if the bar 6 is used as the suspending rod, adjustment of the length of the suspending rod can be realized with ease by employing a bar 6 of a suitably different length. Further, in order to prevent bending of the bar when the loops take on great weight, it is preferred that the bar be placed on an arm 31".

A chain 32' serving as the endless traveling body is wound around sprocket wheels 32'A, 32'B driven by a gear box 32'C. The plane in which the chain 32' travels lies perpendicular to the arms 31" guided slidably through blocks 31'A attached to the chain 32". The side of each arm 31" at the tip thereof contacts the lower side of the bar 6 and suspending rod 23, and the end face of each arm 31" at the end opposite the tip is brought into resilient contact with the side face of a cam 33' by a spring 31'B. The cam 33' has a linear portion 33'C which lies parallel to the bar 6 and suspended rod 23 in the transfer zone and in the region of the suspended rod 23 and which terminates at a position close to the forward end of the bar 6, a portion 33'A contiguous to and overlying the linear portion 33'C, the portion 33'A gradually tapering toward the forward or left end of the apparatus along the length of the bar 6, and a portion 33'B given a comparatively sharp taper so as to project the arm 31" rapidly toward the suspending rod 23 at the position of the rearward portion of the rod.

According to this embodiment of the present invention, the circulating arms 31" are projected from the blocks 31'A towards the bar 6 and suspending rod 23 at the linear portion 33'C of cam 33' in the transfer zone to support the bar 6 and rod 23. When each arm 31" reaches the end of the transfer zone, namely the tip of the linear portion of the cam 33', the arm is freed from the cam 33' and is caused to withdraw into the block 31'A away from the bar 6 by the action of the spring 31'B. The design is such that each arm 31" is not withdrawn more than a prescribed distance. Thereafter, the arm 31" is restored to its projecting position by the tapered portions 33'A, 33'B of cam 33' at a timing which will not allow the arm to strike the bar 6, and the arm is subsequently returned to the starting point of the linear portion 33'C.

Figure 7:
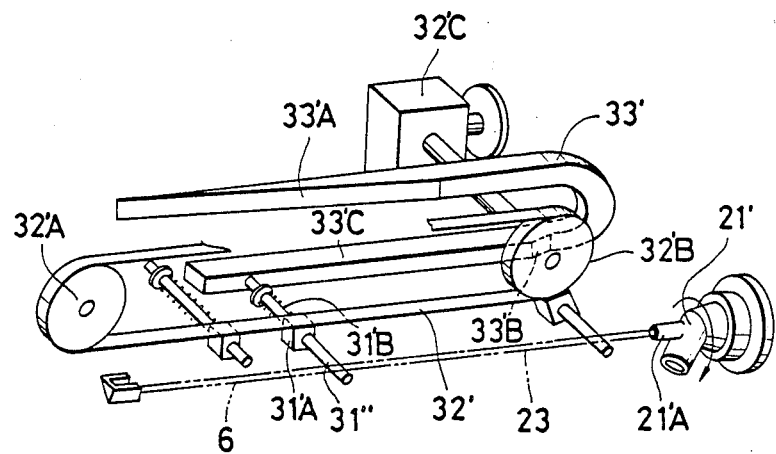
FIG. 7 is a perspective view showing a sixth embodiment of the apparatus.

The sixth embodiment of FIG. 7 requires less space, particularly a smaller floor area, for the transfer means in comparison with the previous embodiment. It also makes it possible to withdraw the arms 31" away from the bar 6 rapidly and enables the bar 6 to be utilized effectively, as in the previous embodiment. Further, since the bar can be used as the suspending rod, it is unnecessary to provide a special mechanism for adjusting the length of the suspending rod.

Figure 8:
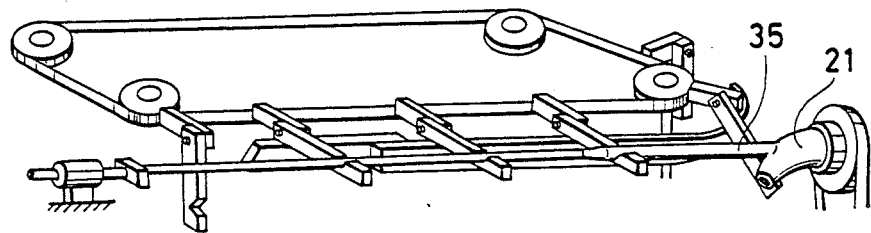
FIG. 8 is a perspective view showing a seventh embodiment of the apparatus, which is an improvement over the fifth embodiment.
Figure 9:
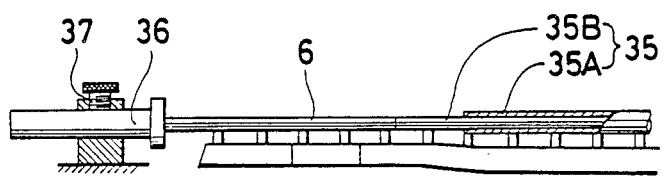
FIG. 9 is a partial sectional view showing the details of a portion related to the bar and suspending rod of FIG. 8.

A seventh embodiment of the invention shown in FIG. 8 improves upon the fifth embodiment by making it possible to freely adjust the length of the suspending rod. The suspending rod, indicated at numeral 35, extends from the looper 21 and, as shown in FIG. 9, comprises a sleeve 35A fixed to the looper 21, and a bar member 35B inserted into the sleeve 35A and capable of being moved freely in and out of the sleeve 35A. Thus, the overall length of the suspending rod 35 can be freely adjusted. A stopper 36 is also capable of being moved longitudinally with adjustment of the suspending rod length. The stopper 36 can be set by a clamp screw 37 at a position where the rearward end of the bar 6 abuts against the distal end of the bar member 35B.

Figure 10:
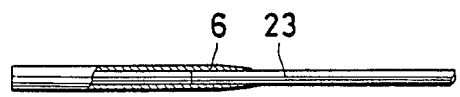
FIG. 10 is a partial sectional view of an eighth embodiment showing the same portion related to the bar and suspending rod.

In an eighth embodiment shown in FIG. 10, the bar 6 is made cylindrical in shape and the suspending rod 23 is adapted to be insertable into the bar 6, thus making it possible to adjust the length of the suspending rod. This arrangement is preferred in terms of strength since both members can be supported at both ends.

Figure 11:
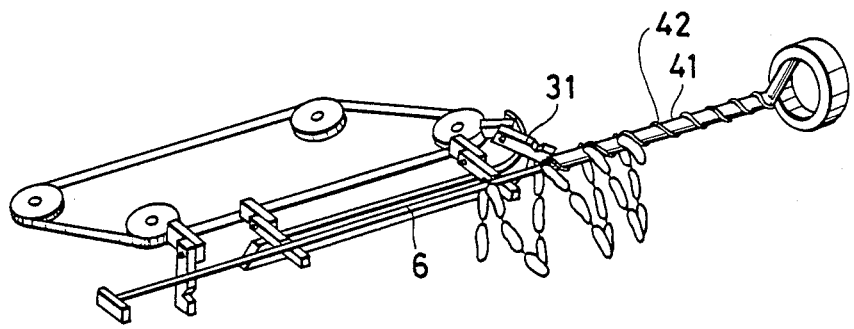
FIG. 11 is a perspective view showing a ninth embodiment of the apparatus.

FIG. 11 illustrates a ninth embodiment, in which the transfer means of the fifth embodiment is connected to suspending means of a different type. Here the suspending means includes a helical ridge provided on a suspending rod 41 which rotates about its axis. The rearward end of the bar 6 abuts against the forward end of the suspending rod 41, and the loops of sausage suspended from the rod 41 are advanced by the revolving helical ridge 42. After the sausage loops have been delivered to the bar 6, the loops are hung from the bar 6 by the transfer means in the same manner as performed by the fifth embodiment. It is preferred that the helical pitch on the forward side of the suspending rod 41 be made larger than the predetermined pitch on the remaining portion of the rod so that the arms 31 will not strike the sausage loops suspended from the suspending rod 41 when loops delivered to the bar 6 start to be transferred by the arms 31.

Figure 12:
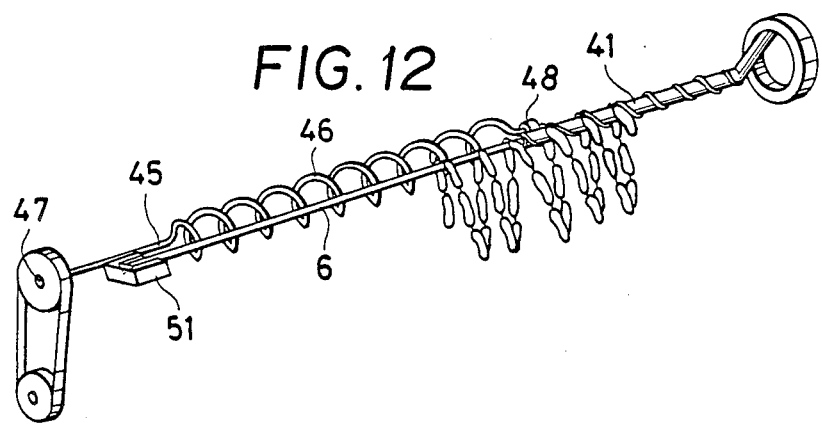
FIG. 12 is a perspective view showing a tenth embodiment of the apparatus.

FIG. 12 illustrates a tenth embodiment of the invention, in which transfer means having a rotating helical body arranged at the side of the bar 6 is combined with the suspending means of the ninth embodiment.

The present embodiment is distinguishable over the foregoing embodiments in that the transfer means itself does not move, and in that the bar 6 is supported at both ends. Specifically, as shown in FIG. 12, the transfer means includes a helical body 46 centered on an axis of rotation 45 and spaced away from the bar 6. The helical body 46 is designed to have a radius long enough to enable the helical body to engage the loops of the sausage suspended from the bar 6, and to have a helical pitch equivalent to the spacing of the arms 31 in the transfer means of the foregoing embodiments. The helical body 46 has end portions journalled by respective bearings 47, 48 on the axis of rotation 45. The forward end portion of the helical body 46 is rotatively driven.

To support the bar 6 at both ends, the forward end face of the suspending rod 41 is provided with an engaging bore extending along the central axis of the rod. The rearward end of the bar 6 is supported by being engaged with this bore. The forward portion of bar 6 is placed upon a seating member 51 provided at a position that will allow the bar to be made parallel to the helical body 46.

The helical body 46 is rotated about the axis 45 to engage with and transfer the sausage loops toward the forward end of the apparatus without the helical body 46 itself advancing. Accordingly, the advantages of the this embodiment are that little space is required for the transfer means and the mechanism thereof is very simple. Another advantage is that the connection between the bar and suspending rod is highly reliable since the rearward portion of the bar is inserted into the bore of the suspending rod.

It should be noted that if the helical body 46 is tapered toward its forward end, i.e., such that the loops of the helix grow successively smaller in diameter from a predetermined point along the helical body toward the forward end thereof, the effects obtained are the same as those provided by the section IIB of the transfer means in the first embodiment of the invention. Rather than tapering the helical body 46 in this manner, an alternative approach would be to adopt an arrangement in which the operation of the apparatus is stopped when the sausages are finished being hung from the bar.

As shown in FIG. 12, the helical body 46 is provided on only one side of the bar 6. However, helical bodies can be situated on both sides of bar 6 to transfer the sausages while applying equal forces from both sides.

It is also possible to adopt a helical body capable of being extended and contracted freely in the axial direction so that the helical pitch can be selected at will.

Figure 13:
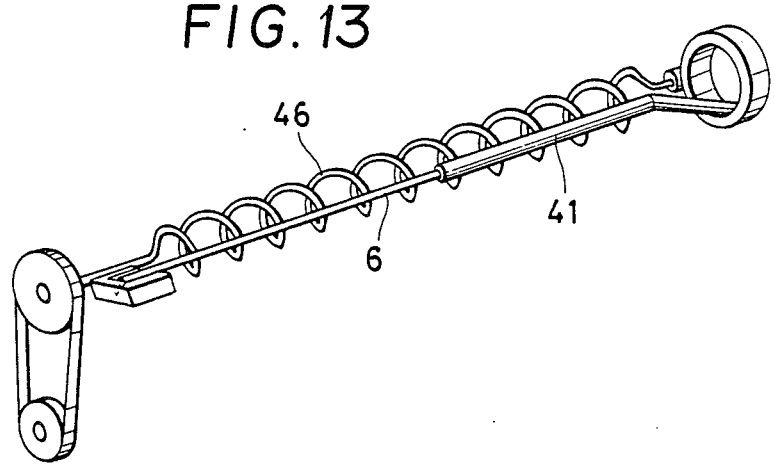
FIG. 13 is a perspective view illustrating a modification in which a single helical body serves as both feed means of a suspending device and transfer means in the apparatus of FIG. 12.

The helical body 46 of the present embodiment can be extended in length and made to serve also as feed means for the suspending means, as shown in FIG. 13. With this arrangement, the suspending rod 41 need only be a simple round rod not provided with the helical ridge. An advantage of using the helical body which doubles as the feed means is that the pitch at which sausages are hung from the suspending rod can be set at will.

The present invention is not limited as to the configuration of the looper and, hence, there is no limitation imposed upon the manner in which sausages are suspended. Accordingly, to apply the present invention to a conventional looper and suspending means, no limitation will be placed upon the looper if some consideration is given to the connection between the transfer means and suspending means.

In accordance with the present invention as described above, the rearward portion of a bar is detachably arranged in close proximity to a suspending device downstream thereof with respect to the direction in which loops of sausage are advanced. With such an arrangement, the loops are shifted onto the rearward portion of the bar starting from the leading loop and are advanced in successive fashion to effect the delivery of all of the loops to the bar. The advantages of this arrangement will now be described.

(1) Movement of the bar such as inserting the bar into the loops or lifting the loops with the bar when the loop transfer is made is unnecessary. This raises the operating efficiency of the apparatus by eliminating the idle time encountered in the prior art.

(2) The loops are transferred to the bar from its rearward portion and are shifted forwardly along the bar one at a time. This makes it possible to deal with a large number of loops when a string of sausages is of great length by lengthening solely the bar and not the suspending device.

(3) If the suspending member is made a suspending rod, a continuous connection can be achieved between the bar and the suspended rod. This makes it possible to deliver loops of sausage that employs natural intestine as the casing, as well as loops of sausage using artificial casing, which has a poor loop-forming property. Moreover, the delivery can be performed smoothly without damaging the sausages.

(4) If the suspending member is capable of being extended or enlarged, it can be applied to sausage that employs natural intestine as the casing or to sausage using the artificial casing having the poor loop-forming property. Moreover, the suspending member will not damage the sausage.

(5) If the arrangement is such that the bar is supported by the arms of the transfer means, the bar will not bend under the weight of heavy loops. This will make it possible to employ a bar which is slender in shape.

(6) Since the arrangement is such that two strings of sausage (the equivalent of two bars) is suspended from the suspending means and bar, the sausages (bar) are not removed from the apparatus until the leading and trailing end processing of the sausages is completed. This makes it unnecessary to interrupt operation in order to perform the terminal processing and simplifies the terminal processing operation.

As many apparently widely different embodiments of the present invention can be made without departing from the spirit and scope thereof, it is to be understood that the invention is not limited to the specific embodiments thereof except as defined in the appended claims.

What is claimed is:

1. In a method of producing a string of linked sausages or the like suspended from a bar in loops, a method of delivering the sausages to the bar, the steps comprising:

(a) at an upstream position from a suspending means forming the sausage string into a series of spiral loops having a leading sausage loop, (b) suspending the series of spiral loops of sausage including its leading sausage loop from said suspending means, (c) removably fixing axially a bar such that the entire bar extends downstream of the leading sausage loop on the suspending means with the upstream end of the bar facing said leading sausage loop on said suspending means, (d) delivering the leading sausage loop on the suspending means onto the upstream end of the bar starting from the leading loop so that the bar supports the loop, (e) while maintaining the sausage loops spaced apart from one another, continuing to deliver successive loops of the sausage string on the suspending means to the upstream end of the bar end while simultaneously sliding the already-delivered loops along the fixed bar down toward its downstream end, and (f) removing the bar with its suspended string of sausage loops thereon.

2. The method of claim 1 wherein the suspending means is a suspending rod mounted so as to extend substantially axially between the loop-forming means and the upstream end of the removable bar; steps (a) and (b) are carried out to form the sausage loops and support them on the said rod while maintaining the sausage loops spaced apart on the rod, step (d) is carried out by sliding the sausage loops along the rod and then in succession onto the bar starting from its upstream end.

3. Apparatus for processing a string of linked sausages or the like, comprising:

(a) looper means for forming a string of linked sausages into loops, (b) suspending means for suspending a string of linked sausages in adjacent loops, (c) a carrying bar for the sausages, said carrying bar having an upstream end, (d) supporting means downstream of the suspending means for detachably supporting said carrying bar in a fixed axial position with its upstream end facing the leading sausage loop, (e) means for delivering the sausage loops in succession from the suspending means to the carrying bar starting with placing the leading sausage loop onto the upstream carrying end, (f) and transfer means for sliding the sausage loops from the upstream carrying bar end down toward its downstream end while maintaining the sausage loops in spaced relation as they are delivered to the carrying bar and while they are being slid along the carrying bar.

4. Apparatus according to claim 3 wherein said transfer means extend at least up to a region at a downstream end portion of said suspending means and also serves as the delivering means in said region.

5. The apparatus according to claim 3, wherein said suspending means comprises:

a suspending rod for suspending the loops of sausage, and feed means for advancing the loops of sausage.

6. The apparatus according to claim 5, wherein said feed means is the transfer means having a transfer region extended over the range of the suspending rod.

7. The apparatus according to claim 3, wherein said suspending means extends at least up to a region at an upstream portion of said transfer means and also serves as the delivering means in said region.

8. The apparatus according to claim 3, wherein said transfer means includes an endless traveling body having a transfer zone running from a region at the upstream portion of the bar or a least a region at the downstream end portion of said suspending means toward a downstream end portion of the bar and spaced away from the bar or from the bar and suspending means, said endless traveling body having a plurality of arms attached thereto for contacting the loops of sausages suspended from the bar.

9. The apparatus according to claim 8, wherein each of said arms supports the bar in the transfer zone when the bar is placed thereon.

10. The apparatus according to claim 8, wherein each of the arms of said transfer means are mounted to move downwardly or to be withdrawn longitudinally of the arm to a position out of contact with the sausages at the downstream end portion of the bar from a position contacting the sausages and to be returned to the position contacting the sausages.

11. The apparatus according to claim 3, wherein said transfer means comprises a helical body which rotates about an axis spaced away from the bar or from the bar and suspending means, said helical body extending from a region at the upstream portion of the bar or at least a region at the downstream end portion of said suspending means toward a region at a downstream end portion of the bar.

12. The apparatus according to claim 8, wherein said suspending means comprises:
a suspending rod for suspending the loops of sausage, and
feed means for advancing the loops of sausage.

13. The apparatus according to claim 12, wherein said feed means is the transfer means having a transfer region extended over the range of the suspending rod.

14. The apparatus according to claim 12, wherein a downstream end of the suspending rod is arranged at a position where it abuts against the upstream end of the bar, or above the upstream end portion of the bar.

15. The apparatus according to claim 3, wherein said suspending means comprises:
an endless traveling body;
a plurality of support members attached to said endless traveling body for suspending the loops of the sausage; and
front and rear drive wheels about which said endless traveling body is wound for being driven thereby.

16. The apparatus according to claim 15, wherein said front drive wheel is arranged in close proximity to the upstream end of the bar.

17. The apparatus according to claim 16, wherein each of said support members is capable of being spread apart.

18. The apparatus according to claim 3, wherein said suspending means has a portion from which the sausage loops are suspended, said portion being variable in length.

19. Apparatus according to claim 3, wherein said linked sausages in adjacent loops are slidably supported by said suspending means and then by said carrying bar, and wherein said suspending means comprises a suspending rod positioned downstream from said looper means and wherein said carrying bar is positioned downstream from said suspending rod.

20. Apparatus according to claim 3, wherein said transfer means extends along the length of said suspending rod and said carrying bar and are separate therefrom.

21. Apparatus according to claim 19, wherein said transfer means extends along the length of said suspending rod and carrying bar and are separate therefrom.

22. An apparatus according to claim 3, wherein the suspending means comprises an endless chain provided with hooks for suspending the sausage loops, and wherein the transfer means is separated from the carrying bar and extends along the carrying bar.

23. An apparatus according to claim 3, wherein the suspending means comprises a rotating rod having a helical ridge thereon, and wherein the transfer means is separated from the carrying bar and extends along the rotating rod.

24. The method according to claim 2, wherein the sausage loops on the rod and the bar are transferred by a transfer means, and wherein said transfer means is separate from the rod and the bar and extends along the rod and the bar.

* * * * *